United States Patent [19]
Aoyama et al.

[11] Patent Number: 5,497,256
[45] Date of Patent: Mar. 5, 1996

[54] NORMALLY BLACK MODE LIQUID CRYSTAL DISPLAY APPARATUS HAVING LIQUID CRYSTAL CELL OF THE FIRST MINIMUM DESIGN

[75] Inventors: Kaori Aoyama, Tenri; Toshiyuki Yoshimizu, Kyoto, both of Japan

[73] Assignee: Sharp Kabushiki Kaisha, Osaka, Japan

[21] Appl. No.: 305,644

[22] Filed: Sep. 14, 1994

[30] Foreign Application Priority Data

Sep. 14, 1993 [JP] Japan ................... 5-229134

[51] Int. Cl.⁶ ............................. G02F 1/1335
[52] U.S. Cl. ............................. 359/73; 359/63
[58] Field of Search ..................... 359/73, 63

[56] References Cited

U.S. PATENT DOCUMENTS 5,184,236  2/1993  Miyashita et al. ............... 359/73
5,237,438  8/1993  Miyashita et al. ............... 359/73

FOREIGN PATENT DOCUMENTS 0576931   1/1994   European Pat. Off. ............ 359/73
1254917  10/1989   Japan ........................... 359/73
2146002   6/1990   Japan ........................... 359/73
5181116   7/1993   Japan ........................... 359/73

Primary Examiner—William L. Sikes
Assistant Examiner—James A. Dudek
Attorney, Agent, or Firm—Birch, Stewart, Kolasch & Birch

[57] ABSTRACT

A liquid crystal display includes a liquid crystal cell including a pair of substrates and a liquid crystal filled between the substrates, and a phase plate located adjacent to one of the substrates of the liquid crystal cell and having a retardation value of 400 to 500 nm. The wavelength dependency of the retardation value of the phase plate being substantially uniform.

15 Claims, 7 Drawing Sheets

$C_L : C_M = 10 : 1$

NORMALLY BLACK MODE LIQUID CRYSTAL DISPLAY APPARATUS HAVING LIQUID CRYSTAL CELL OF THE FIRST MINIMUM DESIGN

BACKGROUND OF THE INVENTION

1. Field of the Invention

The present invention relates to a twisted nematic (TN) liquid crystal display, and more particularly, it relates to a TN liquid crystal display which includes pixels arranged in a matrix and uses a non-linear active element as a switching element for each pixel.

2. Description of the Related Art

Liquid crystal displays have many applications. They are used not only as relatively low information content displays in calculators and digital watches, but also as high information content displays in word processors, personal computers, and the like.

As a driving method for such liquid crystal displays, a duty driving method and a static driving method are known. Recently, an active driving method has often been used. In the active driving method, pixels are respectively connected to active elements so that the on/off state of each pixel is controlled by means of a corresponding active element. A three-terminal element such as a thin film transistor (TFT) and a two-terminal element such as a diode are known as typical active elements. The active driving method is used in a twisted nematic (TN) liquid crystal display.

FIG. 3A is a schematic diagram showing the construction of a conventional TN liquid crystal display employing such an active driving method. In the liquid crystal display of FIG. 3A, polarizing plates 1 and 3 are provided on both sides of a liquid crystal cell 2, respectively. The liquid crystal display is so positioned that the polarizing plate 1 is located on the front side. The liquid crystal cell 2 includes a pair of transparent substrates 4 and 4', and a nematic liquid crystal layer 5 sandwiched therebetween. A pair of alignment films (not shown) are formed on the surfaces of the substrates 4 and 4' facing the liquid crystal layer 5, respectively. The substrates 4 and 4' are arranged so that the liquid crystal molecules of the liquid crystal layer 5 make a 90° twist going from the substrate 4' to the substrate 4.

In the optical design for an active matrix type liquid crystal display such as shown in FIG. 3A, it is necessary to consider the relationship between the capacitance and resistance of an active element and those of the liquid crystal layer 5, and also to consider the anisotropy of refractive index ($\Delta n$) of the liquid crystal material used for the liquid crystal layer 5. The following describes an optical design for the liquid crystal display of FIG. 3A in which, for example, an MIM (Metal-Insulator-Metal) element, one of the two-terminal non-linear elements, is used as the active element.

FIG. 4 shows an equivalent circuit of a single pixel portion of such a liquid crystal display employing an MIM element. In order to attain high resolution and small crosstalk in the liquid crystal display employing the MIM element, it is desirable that the ratio of the capacitance $C_L$ of the liquid crystal to the capacitance $C_M$ of the active element (MIM element) shown in FIG. 4, i.e., $C_L/C_M$, be large. It is known that the MIM element exhibits excellent characteristics when $C_L/C_M$ is equal to or Greater than 10. The MIM element has, for example, a Ta/Ta$_2$O$_5$/Ti structure. In this case, when the Ta$_2$O$_5$ insulating film of the MIM element has a dielectric constant $\epsilon_r$ of 24 and a thickness of 700 Å, and the size of the MIM element is 5 µm×5 µm, the element capacitance $C_M$ becomes 0.076 pF. Accordingly, in order to obtain a capacitance ratio $C_L/C_M$ of 10 or more, the liquid crystal capacitance $C_L$ is required to be equal to or greater than 0.76 pF. In order to obtain a liquid crystal capacitance $C_L$ of 0.76 pF in a TN liquid crystal display having pixels with a dot size of, for example, 0.25 to 0.3 mm, the dielectric constant $\epsilon_r$ of the liquid crystal material in the range of 3 to 14 and the cell gap d of the liquid crystal cell in the range of 4 µm to 10 µm are required, in view of practical use.

In general, a fluorinated liquid crystal is used as the liquid crystal material for an active matrix type liquid crystal display. This is because the liquid crystal material is required to have high resistivity so as to improve the characteristics of the active element. The fluorinated liquid crystal has a low dielectric constant, and accordingly, when it is used for a liquid crystal cell, the cell gap d thereof is required to be small in order to obtain the above-described value of the liquid crystal capacitance $C_L$. The fluorinated liquid crystal also has a small value of $\Delta n$ (the anisotropy of refractive index). Thus, when such a fluorinated liquid crystal is used to prepare a liquid crystal cell having a capacitance ratio $C_L/C_M$ of 10 or more, the resultant liquid crystal cell is of a first minimum design and usually used in the first minimum condition.

A liquid crystal display using such a liquid crystal cell of a first minimum design is disclosed in Japanese Patent Publication No. 4-14329. In this liquid crystal display, a liquid crystal cell having a $\Delta n \cdot d$ value of 210 to 600 nm is used in the normally white mode (the positive transmission or reflection mode), and good display quality is attained.

FIGS. 3B and 3C show the relationship between the transmission axes 101a and 103a of the polarizing plates 1 and 3 and the rubbing directions 104 and 104' of the substrates 4 and 4' of the liquid crystal cell 2 in the normally white mode. The rubbing direction of the substrate is an orientation direction of the liquid crystal molecules which are in contact with the substrate. In the normally white mode, the first polarizing plate 1 and the second polarizing plate 3 are so positioned that their transmission axes 101a and 103a intersect each other at right angles. For example, it is herein assumed that the liquid crystal display uses a 90° TN liquid crystal cell having a cell gap d of 4.5 µm with the anisotropy of refractive index ($\Delta n$) being 0.087. On one side of this liquid crystal cell 2 of a first minimum design, the polarizing plate NPF-F1205Du (manufactured by Nitto Denko Corporation) is provided as the first polarizing plate 1, in such a manner that its transmission axis 101a is parallel to the rubbing direction 104 of the adjacent substrate 4. On the other side of the liquid crystal cell 2, the polarizing plate NPF-F3205M (Nitto Denko Corporation) is provided as the second polarizing plate 3, in such a manner that its transmission axis 103a is parallel to the rubbing direction 104' of the adjacent substrate 4'. With this arrangement, the liquid crystal display can attain relatively good display quality.

The above-described liquid crystal cell of the first minimum design, however, cannot attain good display quality when it is used in a normally black mode liquid crystal display where the polarizing plates 1 and 3 are so positioned that their transmission axes 101a and 103a are parallel to each other. FIGS. 3D and 3E show examples of the arrangement of the polarizing plates 1 and 3 in the normally black mode liquid crystal display. In such a liquid crystal display, the liquid crystal molecules in the vicinity of the substrates 4 and 4' of the liquid crystal cell 2 cannot move easily due to a strong wall effect. Accordingly, when light passes through the liquid crystal cell 2, the behavior of the light in the vicinity of the substrates 4 and 4' is different from that in the bulk of the liquid crystal. As a result, in the liquid crystal cell 2 of the first minimum design having a small $\Delta n \cdot d$ value, light leakage arises, so that neither the display background nor the display image obtained by the application of an OFF voltage can be made to have an excellent tone of black. For example, when one or two kinds of polarizing plates selected from among NPF-G1220DuN, G1225DuN, G1220Du, G1225Du, F1220Du and F1225Du (all manufactured by Nitto Denko F1220Du and F1225Du (all manufactured by Nitto Denko Corporation) are used as the two polarizing plates 1 and 3 disposed respectively on both sides of the liquid crystal cell 2 of the first minimum design, the background color becomes bluish black instead of pure black. The display color obtained by the application of an OFF voltage also becomes bluish black. The display color obtained by the application of an ON voltage becomes bluish white.

If a liquid crystal material having a larger dielectric constant is used or the cell gap d is made larger, it is possible to solve the above-mentioned problem of the low-quality black display in the liquid crystal cell of the first minimum design used in the normally black mode. But these changes in the liquid crystal cell design will change the ratio ($C_L/C_M$) of the liquid crystal capacitance $C_L$ to the element capacitance $C_M$. The change in $C_L/C_M$ decreases resolution and increases crosstalk, thereby causing significant deterioration of display quality.

SUMMARY OF THE INVENTION

The liquid crystal display of this invention, comprises a liquid crystal cell including a pair of substrates and a liquid crystal filled between the substrates, and a phase plate located adjacent to one of the substrates of the liquid crystal cell and having a retardation value of 400 to 500 nm, the wavelength dependency of the retardation value of the phase plate being substantially uniform.

In one embodiment of this invention, a value obtained by subtracting a product $\Delta n \cdot d$ from the retardation value of the phase plate is in the range from 8.5 nm to 108.5 nm, where $\Delta n$ is the anisotropy of refractive index of the liquid crystal and d is a thickness of the liquid crystal cell.

In another embodiment of this invention, the product $\Delta n \cdot d$ of the anisotropy of refractive index ($\Delta n$) of the liquid crystal and the thickness d of the liquid crystal cell is 400 nm or less.

In another embodiment of this invention, the phase plate is a uniaxially extended polyvinyl alcohol film.

In another embodiment of this invention, the liquid crystal is a twisted nematic liquid crystal which undergoes a 90° twist in a predetermined direction.

In another embodiment of this invention, the liquid crystal display further comprises first and second polarizing plates located on both sides of the liquid crystal cell, respectively, wherein the phase plate is positioned between the first polarizing plate and the liquid crystal cell, a transmission axis of the first polarizing plate is shifted through an angle of 85° to 95° in the predetermined direction from a rubbing direction of one of the substrates which is adjacent to the first polarizing plate, and a transmission axis of the second polarizing plate is shifted through an angle of −5° to 10° in the predetermined direction from a rubbing direction of the other substrate which is adjacent to the second polarizing plate.

In another embodiment of this invention, a slow axis of the phase plate is shifted through an angle of 0° to 15° in the predetermined direction from the rubbing direction of one of the substrates which is adjacent to the phase plate.

In another embodiment of this invention, the liquid crystal display further comprises first and second polarizing plates located respectively on both sides of the liquid crystal cell, wherein a transmission axis of the second polarizing plate is shifted through an angle of 5° in the predetermined direction from a transmission axis of the first polarizing plate, the phase plate is positioned between the first polarizing plate and the liquid crystal cell, and a slow axis of the phase plate is shifted through an angle of 10° in the predetermined direction from a rubbing direction of one of the substrates which is adjacent to the phase plate.

In another embodiment of this invention, a transmittance of the first polarizing plate is higher than that of the second polarizing plate.

In another embodiment of this invention, the transmittance of the first polarizing plate is higher than that of the second polarizing plate by 3%.

In another embodiment of this invention, the first and second polarizing plates, the liquid crystal cell and the phase plate are so positioned that light is incident on the second polarizing plate and emitted from the first polarizing plate.

In another embodiment of this invention, the substrates are respectively provided with electrodes for applying a voltage to the liquid crystal, and one of the electrodes includes a plurality of pixel electrodes, each of the pixel electrodes being provided with a switching element.

In another embodiment of this invention, the switching element is an MIM element.

Thus, the invention described herein makes possible the advantage of providing an active matrix type liquid crystal display which can produce a high-quality display image by using a 90° TN liquid crystal cell of the first minimum design in the normally black mode, without changing the liquid crystal cell design.

This and other advantages of the present invention will become apparent to those skilled in the art upon reading and understanding the following detailed description with reference to the accompanying figures.

DESCRIPTION OF THE PREFERRED EMBODIMENTS

Liquid crystal displays according to the present invention will be described in detail below with reference to the accompanying drawings.

Figure 1A:
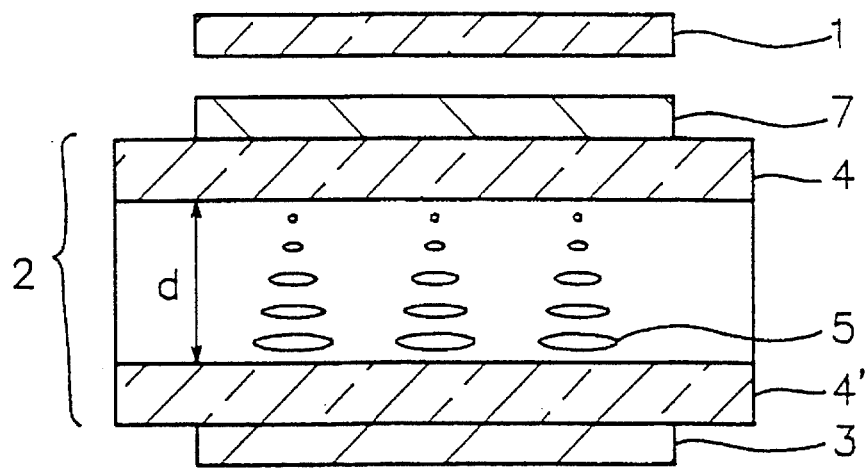
FIG. 1A is a schematic cross-sectional view of a liquid crystal display according to the present invention.

FIG. 1A is a schematic cross-sectional view showing the construction of a liquid crystal display of the present invention. The liquid crystal display has a liquid crystal cell 2 which includes a pair of transparent substrates 4 and 4' and a liquid crystal layer 5 sandwiched therebetween. The liquid crystal cell 2 is of a first minimum design as will be described later. The liquid crystal cell 2 is of an active matrix type, and uses a nematic liquid crystal for the liquid crystal layer 5. On the side of the liquid crystal cell 2 having the transparent substrate 4, a first polarizing plate 1 is provided. On the other side of the liquid crystal cell 2 having the transparent substrate 4', a second polarizing plate 3 is provided. Also on the side of the liquid crystal cell 2 having the substrate 4, a phase plate 7 is provided. The liquid crystal display of FIG. 1A is a transmission type display which operates in the normally black mode. At the time of use, the liquid crystal display is so positioned that the first polarizing plate 1 is located on the front side.

In the liquid crystal cell 2, scanning lines made of strips of transparent conductive film extending in parallel (not shown) are provided on the side of the substrate 4 in contact with the liquid crystal layer 5. On the side of the other substrate 4' in contact with the liquid crystal layer 5, pixel electrodes arranged in a matrix (not shown) and signal electrodes extending in parallel (not shown) are provided. Like the scanning lines, the pixel electrodes are formed of a transparent conductive film. The scanning lines and the signal electrodes are so located that they intersect each other at right angles. Also on the substrate 4', MIM elements (not shown) respectively corresponding to pixels are formed in order to connect the pixel electrodes to the corresponding signal electrodes. On the entire faces of the substrates 4 and 4' in contact with the liquid crystal layer 5, alignment films (not shown) are formed so as to cover the scanning lines on the substrate 4 and the pixel electrodes on the substrate 4', respectively. These alignment films serve to align the liquid crystal molecules of the liquid crystal layer 5 so that the molecules undergo a 90° twist in the region between the substrates 4 and 4'.

A process of fabricating the liquid crystal cell 2 will now be briefly described. First, on the transparent substrate 4 made of glass or the like, a transparent conductive film is deposited by a known method. The thus deposited transparent conductive film is patterned to form a plurality of strips of the conductive film which serve as the scanning lines. On the transparent substrate 4', a metal film is deposited, and then patterned to form the parallel signal electrodes. Then, insulating films are formed on the portions of the signal electrodes which are to serve as the lower electrodes of the MIM elements. Further on the insulating films, metal films which are to serve as the upper electrodes of the MIM elements are formed. As a result, the MIM elements are obtained. Thereafter, the pixel electrodes are so formed that each pixel electrode overlaps at least part of the corresponding upper electrode. In the fabrication of the liquid crystal display of the present invention, Ta was used as the material for the signal electrodes. The surfaces of the Ta signal electrodes were anodized to form $Ta_2O_5$ films, which were used as the insulating films of the MIM elements. The upper electrodes of the MIM elements were formed of Ti. The liquid crystal display of the present invention was also prepared so that the number of the pixels was 640×480, the dot size of each pixel was 0.25 mm, and the size of each MIM element was 5 μm×6 μm.

After the electrodes and lines are formed on the substrates 4 and 4' in the above-described manner, the alignment films are formed on the entire surfaces of the substrates 4 and 4' so as to cover the electrodes and lines. The thus formed alignment films are subjected to an alignment treatment; for example, they are rubbed. Thereafter, the two substrates 4 and 4' are joined together with their alignment films facing the inside. At this time, the substrates 4 and 4' are so positioned that the liquid crystal to be filled between them later will have a 90° twisted structure. Finally, the liquid crystal is filled between the substrates 4 and 4'. In the liquid crystal display of the present invention, the ratio ($C_L/C_M$) of the liquid crystal capacitance $C_L$ to the element capacitance $C_M$ was set to 10, by using the fluorinated liquid crystal ZLI-3021-000 manufactured by Merck (dielectric constant $\epsilon_{11}$=8.5, Δn=0.087) for the liquid crystal layer 5, and by allowing the liquid crystal cell 2 to have a cell gap d of 4.5 μm.

As can be seen from the above description, the liquid crystal cell 2 used in the liquid crystal display of FIG. 1A is of a first minimum design, and the Δn·d value thereof is 391.5 nm. Thus, the liquid crystal cell 2 is usually used in the normally white mode. The liquid crystal display according to the present invention, however, can produce a high-quality display image also in the normally black mode without changing the design of the liquid crystal cell 2, by using the phase plate 7 which satisfies the requirements described below.

The requirements to be satisfied by the phase plate 7 used in the liquid crystal display of the present invention will now be described with reference to Tables 1 and 2. Table 1 shows the relationship between the retardation value Re of the phase plate 7 and the quality of the display image in cases where the phase plate 7 is a film obtained by uniaxially extending polyvinyl alcohol (hereinafter referred to as "PVA"). Table 2 shows the relationship between the retardation value Re of the phase plate 7 and the display quality in cases where the phase plate 7 is a film obtained by uniaxially extending polycarbonate (hereinafter referred to as "PC").

TABLE 1

| | PVA Phase plate | |
| --- | --- | --- |
| Re | Display quality | Re - Δnd |
| 390 | X | −1.5 |
| 400 | Δ | 8.5 |
| 420 | Δ | 28.5 |
| 440 | ○ | 48.5 |
| 460 | ○ | 68.5 |
| 480 | Δ | 88.5 |
| 500 | Δ | 108.5 |
| 520 | X | 128.5 |

TABLE 2

| PC phase plate | | | |
|---|---|---|---|
| Re | Display quality | Re | Display quality |
| 200 | X | 480 | X |
| 230 | X | 508 | X |
| 260 | X | 565 | ○ |
| 300 | X | 660 | Δ |
| 330 | X | 674 | Δ |
| 360 | X | 687 | Δ |
| 428 | X | 700 | Δ |
| 455 | X | 720 | Δ |

Figure 1B:
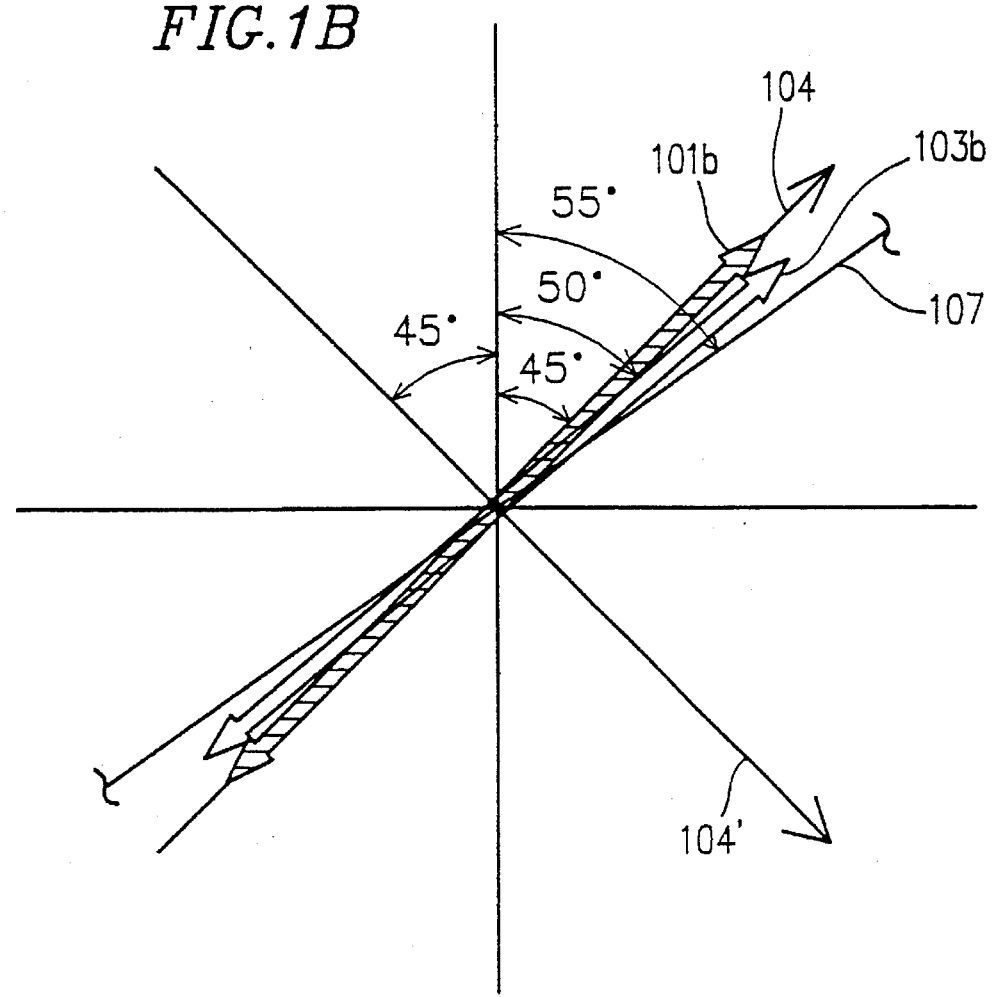
FIG. 1B is a diagram showing the arrangement of the slow axis of a phase plate, the absorption axes of polarizing plates and the rubbing directions of the substrates of a liquid crystal cell, in the liquid crystal display of FIG. 1A.
Figure 1C:
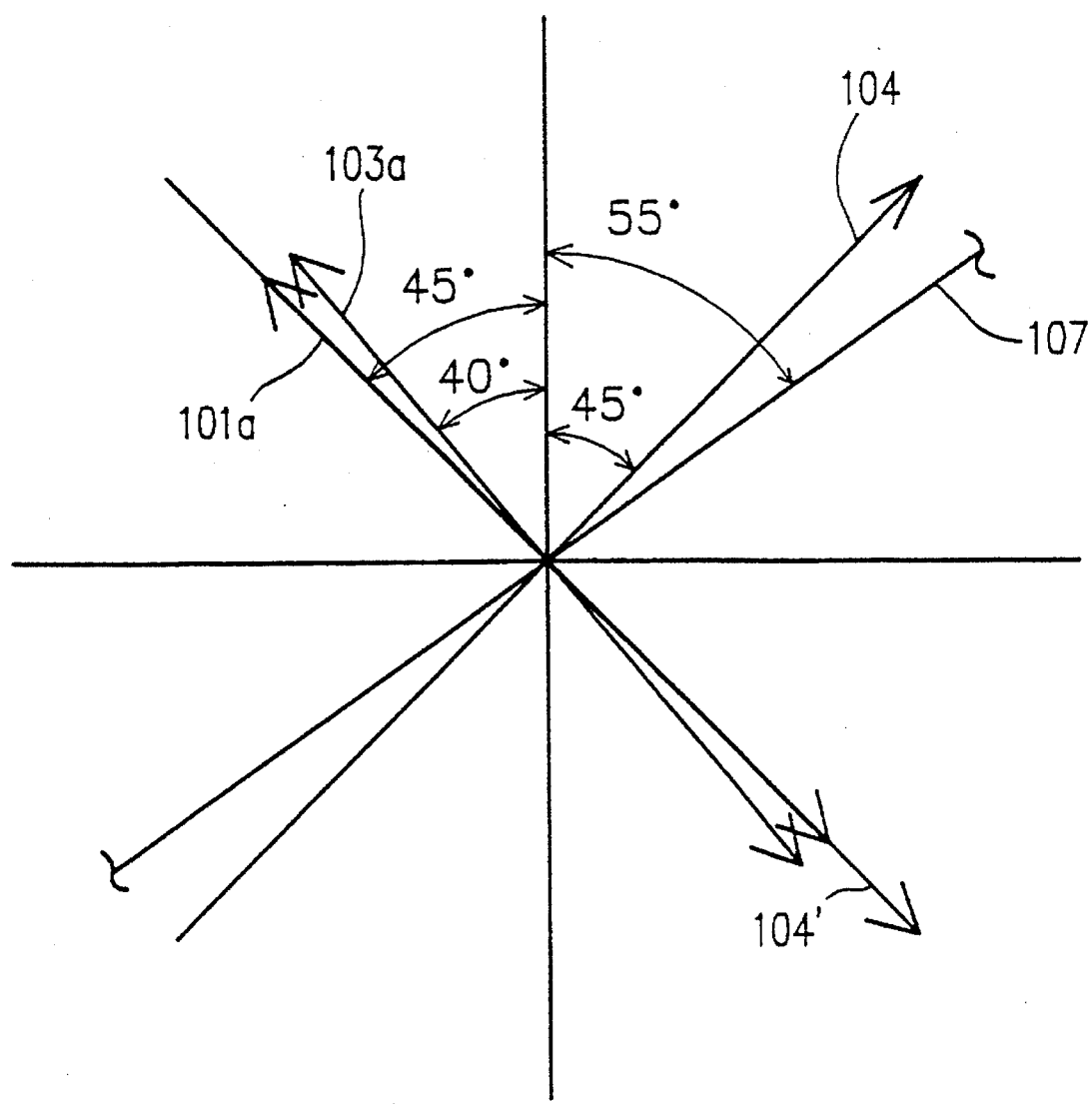
FIG. 1C is a diagram showing the arrangement of the slow axis of a phase plate, the transmission axes of polarizing plates and the rubbing directions of the substrates of a liquid crystal cell, in the liquid crystal display of FIG. 1A.

The specific design of the liquid crystal displays used in the estimation of display quality shown in Tables 1 and 2 was as follows. As the liquid crystal cell 2, a liquid crystal cell with a Δn·d value of 391.5 nm fabricated in the above-described manner was used. As the first polarizing plate 1 and the second polarizing plate 3, the polarizing plates NPF-G1225DuN (transmittance: 44.5%) and NPF-G1220Du (transmittance: 41.5%), respectively, both manufactured by Nitto Denko Corporation, were used. As shown in FIG. 1A, the phase plate 7 was placed between the first polarizing plate 1 and the substrate 4 of the liquid crystal cell 2. FIG. 1B shows the positional relationship among the absorption axes 101b and 103b of the polarizing plates 1 and 3, the slow axis 107 (hereinafter referred to as the "S axis") of the phase plate 7, the orientation direction 104 of the liquid crystal molecules in contact with the front-side substrate 4 (hereinafter referred to simply as a "rubbing direction"), and the rubbing direction 104' of the back-side substrate 4'. As shown in FIG. 1B, the substrates 4 and 4' are so positioned that the liquid crystal molecules are twisted clockwise (when viewed from the backside substrate 4'). The phase plate 7 is so positioned that its S axis 107 is shifted 10° clockwise from the rubbing direction 104 of the front-side substrate 4. The first polarizing plate 1 is so positioned that its absorption axis 101b is parallel to the rubbing direction 104 of the front-side substrate 4, i.e., its transmission axis 101a is perpendicular to the rubbing direction 104 of the front-side substrate 4 as shown in FIG. 1C. Similarly, the second polarizing plate 3 is so positioned that its absorption axis 103b is shifted 5° clockwise from the rubbing direction 104 of the front-side substrate 4, i.e., its transmission axis 103a is shifted 5° clockwise from the rubbing direction 104' of the back-side substrate 4' as shown in FIG. 1C.

As can be seen from Table 1, in cases where the uniaxially extended PVA film was used as the phase plate 7, the display image produced by the application of an OFF voltage and the display background had an improved tone of black when the retardation value Re was in the range of 400 to 500 nm, i.e., the value obtained by subtracting Δn·d from Re was in the range of 8.5 to 108.5 nm. Particularly, when the value obtained by the subtraction "Re–Δn·d" was in the range of 60 to 65 nm or the retardation value Re was in the range of 450 to 460 nm, excellent black displays could be obtained. In this manner, the display image produced by the application of an OFF voltage and the display background are allowed to have an improved tone of black, by making the phase difference of the phase plate 7 (retardation value Re) larger than that of the liquid crystal cell 2 (Δn·d).

Figure 2:
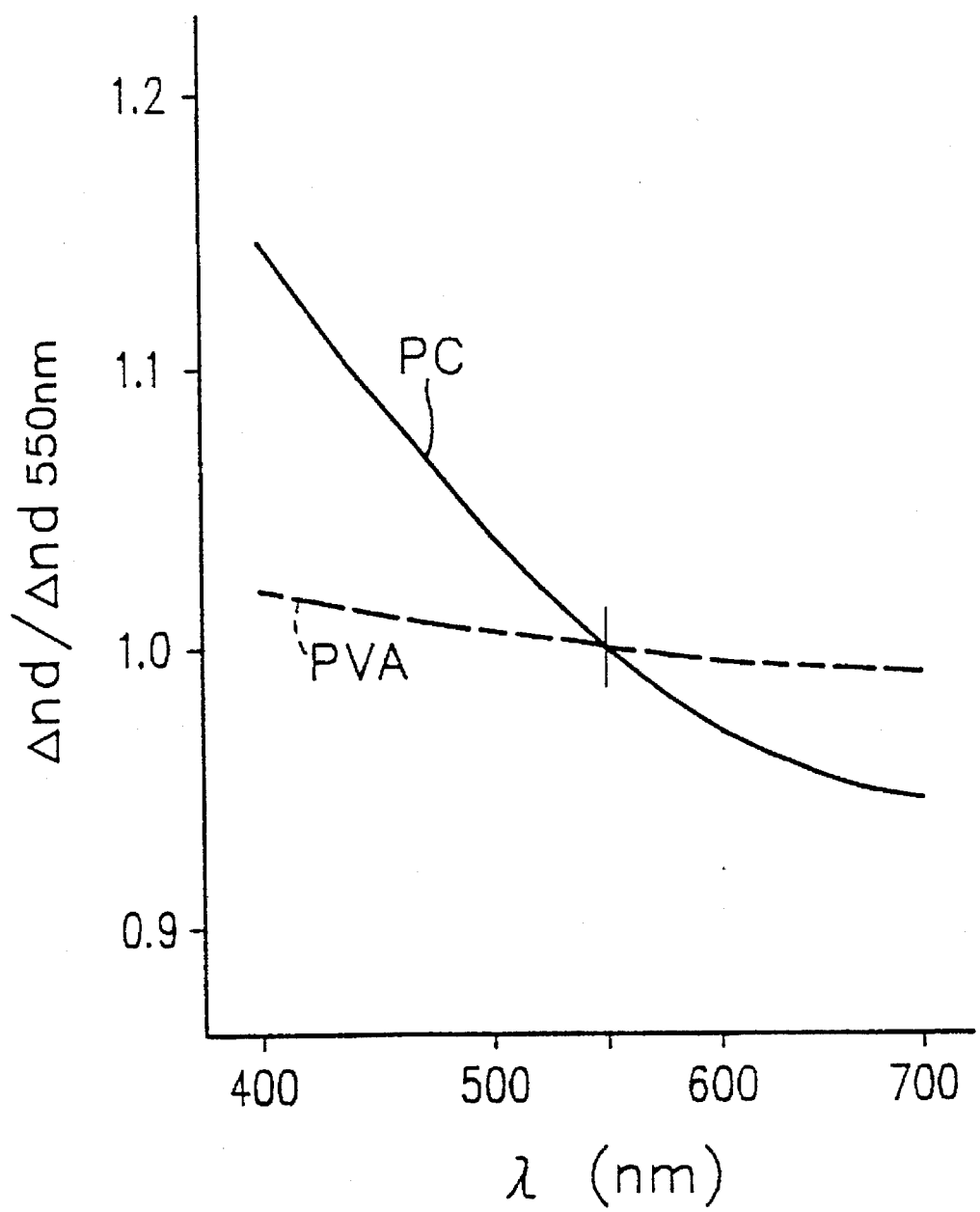
FIG. 2 is a graph showing a comparison of the wavelength dispersion characteristics of polyvinyl alcohol (PVA) and polycarbonate (PC).
Figure 3A:
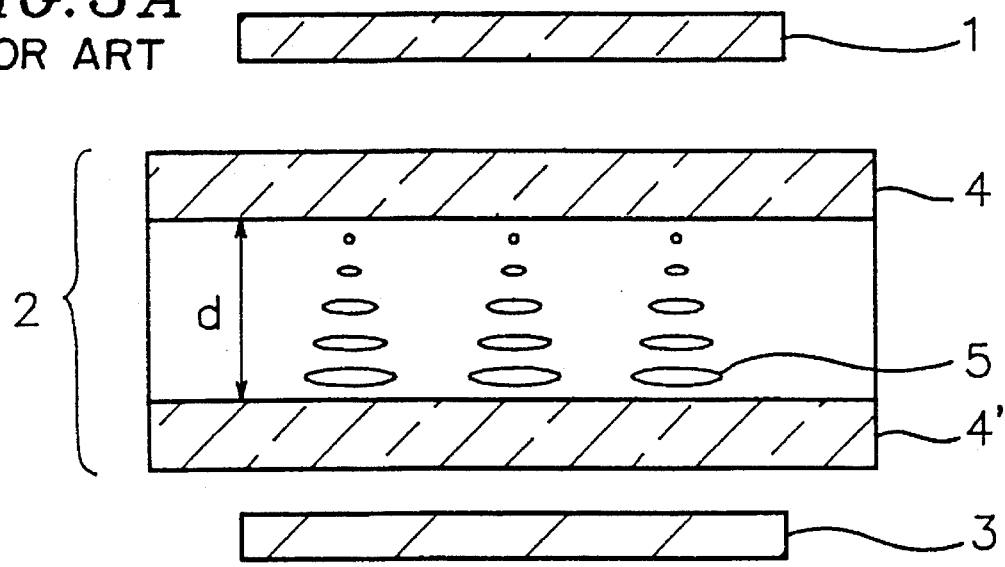
FIG. 3A is a schematic cross-sectional view of a conventional liquid crystal display.
Figure 3B:
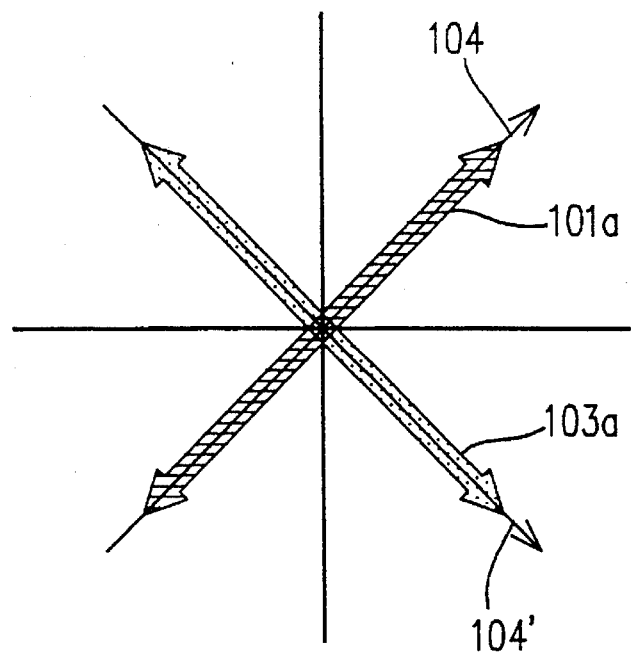
FIGS. 3B and 3C are diagrams each showing the arrangement of the transmission axes of polarizing plates and the rubbing directions of the substrates of a liquid crystal cell in a normally white mode liquid crystal display.
Figure 3C:
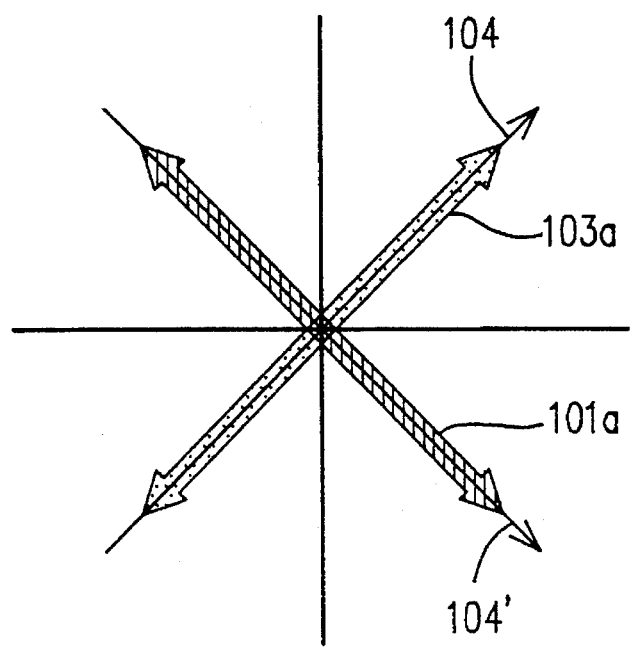
Figure 3D:
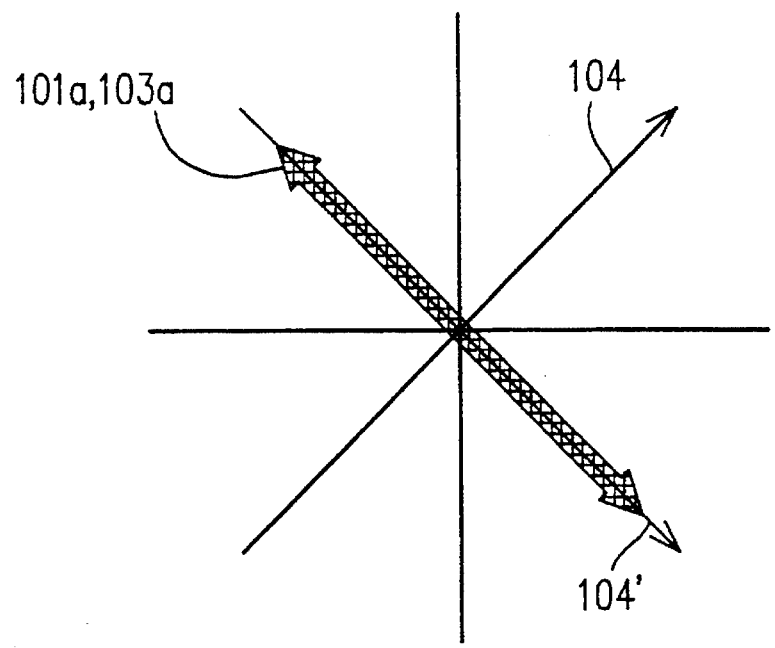
FIGS. 3D and 3E are diagrams each showing the arrangement of the transmission axes of polarizing plates and the rubbing directions of the substrates of a liquid crystal cell in a normally black mode liquid crystal display.
Figure 3E:
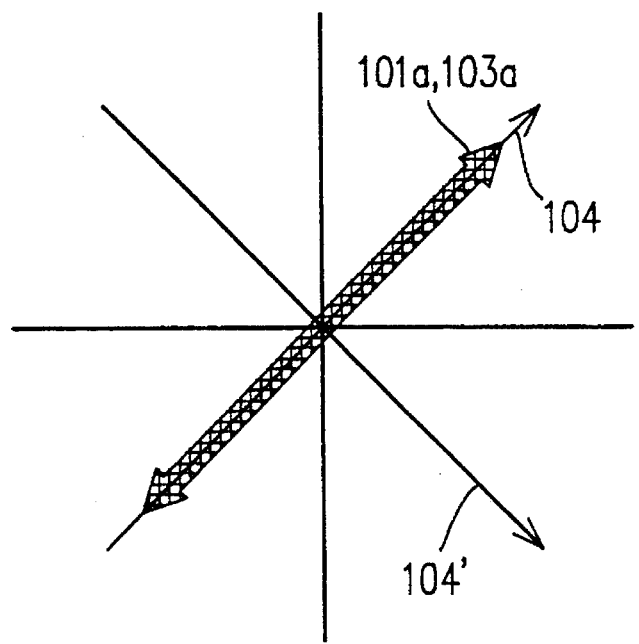
Figure 4:
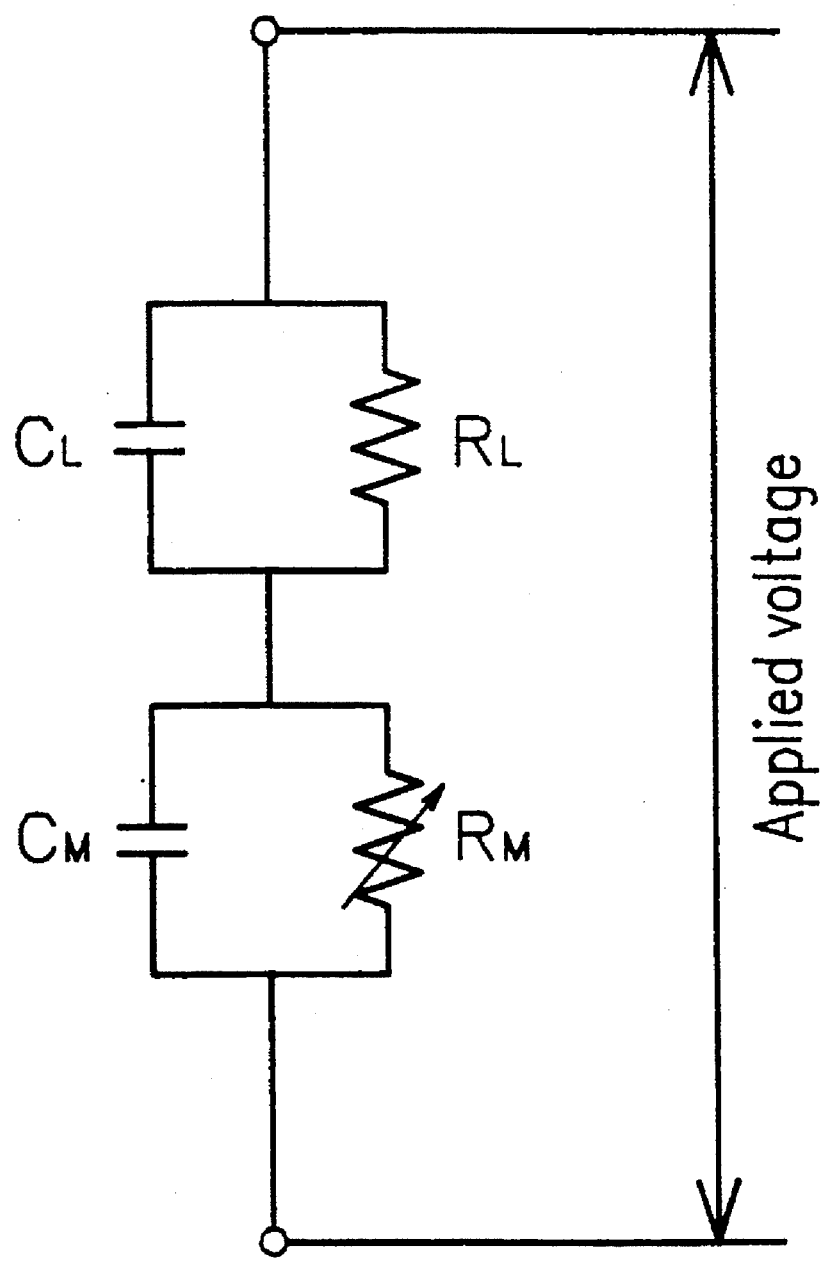
FIG. 4 shows an equivalent circuit of a single pixel portion of a liquid crystal display using an MIM element as a switching element.

On the other hand, in cases where the uniaxially extended PC film was used as the phase plate 7, as shown in Table 2, the appropriate range of retardation values Re which makes it possible to obtain improved black displays was shifted toward higher values, as compared with the appropriate range of retardation values Re in the case of the PVA film. With the use of the PC film, particularly good black displays could be obtained when the retardation value Re was in the range of 560 to 570 nm. The shift in the appropriate retardation value range toward higher values in the case of the PC film is caused by the difference in the wavelength dispersion characteristics between the uniaxially extended PC film and the uniaxially extended PVA film (shown in FIG. 2). As shown in FIG. 2, the wavelength dependency of the retardation value of the PVA film is substantially uniform, whereas the retardation value of the PC film varies greatly depending on the wavelength. The optimum retardation value Re was 455 nm when the uniaxially extended PVA film was used, and 565 nm when the uniaxially extended PC film was used.

Next, the retardation values Re of the phase plates 7 of uniaxially extended PVA and PC films were set to their respective optimum values described above, and the tones of black in the resultant black displays were estimated. The results are shown in Table 3.

TABLE 3

| Phase plate | Re | Vop | L* | u* | v* | C* |
|---|---|---|---|---|---|---|
| PVA | 455 nm | 15.3 V | 6.83 | 0.72 | 3.15 | 3.23 |
| PC | 565 nm | 16.2 V | 8.67 | 9.23 | –0.18 | 9.23 |

As can be seen from Table 3, the chroma C* was 3.23 when the uniaxially extended PVA film was used as the phase plate 7, and it was 9.23 when the uniaxially extended PC film was used. This means that the use of the uniaxially extended PVA film allows the resultant black display to have a darker tone of black, as compared with the use of the uniaxially extended PC film. The reason for this is as follows: In a liquid crystal cell of a first minimum design such as disclosed in Japanese Patent Publication No. 4-14329, the liquid crystal has small wavelength dispersion, and even if the effective wavelength dispersion of the 90° twisted optical rotatory component (i.e., the phase difference) increases, the wavelength dispersion of the entire liquid crystal cell is still small. Accordingly, compared with the use of the phase plate of the PC film having large wavelength dispersion, the use of the phase plate of the PVA film having small wavelength dispersion can attain higher optical compensation.

Therefore, even with the use of a liquid crystal cell 2 of a first minimum design, it is possible to provide a liquid crystal display capable of producing a high-quality black display image in the normally black mode, by using a phase plate 7 of a uniaxially extended PVA film having a retardation value Re of 400 to 500 nm, and preferably 450 to 460 nm.

The reason for providing the phase plate 7 on the front side of the liquid crystal cell 2 in the liquid crystal display of FIG. 1A is as follows: Since the liquid crystal display of FIG. 1A is, as described above, a transmission type liquid crystal display which operates in the normally black mode (i.e., a negative transmission type liquid crystal display), a backlight source is located on the back side of the liquid crystal cell 2. Thus, compared with the provision of the phase plate 7 on the back side of the liquid crystal cell 2, the provision of the phase plate 7 on the front side can attain a higher optical compensation effect, thereby darkening a black display obtained by the application of an OFF voltage and also darkening the black background.

Next, liquid crystal displays having a construction such as shown in FIG. 1A were prepared by using different combinations of polarizing plates having various transmittances as the first (front-side) polarizing plate 1 and the second (back-side) polarizing plate 3. Using the thus prepared liquid crystal displays, the color tones of display images obtained by the application of an ON voltage were estimated. As a result, the best color tone could be obtained when the polarizing plate NPF-G1225DuN having a transmittance of 44.5% and the polarizing plate NPF-G1220Du having a transmittance of 41.5% (both manufactured by Nitto Denko Corporation) were used as the first polarizing plate 1 and the second polarizing plate 3, respectively. This indicates that the display color (white) obtained by the application of an ON voltage has the best tone of white when the transmittance of the first polarizing plate 1 is higher than that of the second polarizing plate 3 by 3%. In the liquid crystal displays used in this estimation, the rubbing directions 104 and 104' of the substrates 4 and 4', the absorption axes 101b and 103b of the first and second polarizing plates 1 and 3 and the S axis 107 of the phase plate 7 were arranged as shown in FIG. 1B, which was the same arrangement as that used in the above-described estimation carried out by using the phase plates 7 having different retardation values Re. The liquid crystal cell 2 was of the first minimum design as described above. The phase plate 7 was composed of a uniaxially extended PVA film having a retardation value Re of 455 nm (optimum value).

Next, the background color, the display color (black) obtained by the application of an OFF voltage and the display color (white) obtained by the application of an ON voltage in cases where different combinations of the polarizing plates having various transmittance were used, was observed by eyes. In the observation by eyes, the quality of the white display obtained by the application of an ON voltage is excellent when the transmittance of the first polarizing plate 1 is made higher than that of the second polarizing plate 3. The reason for this is that the light which has passed through the liquid crystal cell 2 and the phase plate 7 can be prevented from being greatly attenuated by the first polarizing plate 1. Preferably, the transmittance of the first polarizing plate 1 is made higher than that of the second polarizing plate 3 by 3% to 6% so as to obtain an excellent white display when an ON voltage is applied.

Table 4 shows the results of the estimation in cases of using different combinations of polarizing plates having various transmittances as in the above observation by eyes. The polarizing plates used in this estimation are: NPF-G1220DuN (transmittance: 41.5%), NPF-G1225DuN (44.5%), NPF-G1220Du (41.5%) and NPF-G1225Du (44.5%).

TABLE 4

| First polarizing plate | Second polarizing plate | Vop | Background color | | | OFF color | | | ON color | | |
|---|---|---|---|---|---|---|---|---|---|---|---|
| | | | L* | u* | v* | L* | u* | v* | L* | u* | v* |
| G1220DUN | G1220DUN | 15.8 | 3.72 | −0.89 | 2.86 | 4.51 | −0.60 | 4.15 | 35.34 | −0.25 | 8.01 |
| G1225DUN | G1225DUN | 15.9 | 4.07 | −0.66 | 0.10 | 5.04 | −0.05 | 1.78 | 40.31 | 0.43 | 8.86 |
| G1220DU | G1220DU | 16.1 | 3.33 | −0.08 | 1.63 | 3.71 | 0.34 | 3.08 | 37.47 | −0.25 | 8.76 |
| G1225DU | G1225DU | 16.4 | 5.36 | −0.08 | 1.94 | 6.24 | 0.20 | 3.85 | 41.94 | 0.18 | 6.53 |
| G1225DUN | G1220DU | 16.1 | 3.44 | −1.02 | 1.21 | 4.60 | −0.40 | 3.11 | 38.54 | 0.23 | 8.15 |
| G1220DU | G1225DUN | 16.7 | 4.86 | −1.36 | 2.48 | 5.46 | −1.11 | 3.85 | 41.59 | −1.05 | 7.71 |

When the phase plate 7 and the polarizing plates 1 and 3 were so positioned that the S axis 107 of the phase plate 7 coincided with the absorption axis of the polarizing plate 1 or 3, the resultant display image was colored undesirably when viewed from an oblique direction with respect to the phase plate 7 and the polarizing plates 1 and 3. Furthermore, when the S axis 107 of the phase plate 7 was perpendicular to the transmission axis of the polarizing plate 1 or 3, the viewing angle of the liquid crystal display became smaller. Thus, in the liquid crystal display of the present invention, in order to prevent the above-mentioned undesirable coloring and reduction in the viewing angle, the phase plate 7 and the polarizing plates 1 and 3 are so positioned that, as shown in FIG. 1B, the S axis 107 of the phase plate 7 does not coincide with the absorption axis of the first polarizing plate 1 or the second polarizing plate 3, i.e., the S axis 107 is not perpendicular to the transmission axis of the first polarizing plate 1 or the second polarizing plate 3. Specifically, the display image obtained by the application of an OFF voltage and the display background had an excellent tone of black when the phase plate 7 and the polarizing plates 1 and 3 were positioned as follows: First, the phase plate 7 was so positioned that its S axis 107 was shifted through an angle of 0° to 15° from the rubbing direction 104 of the front-side substrate 4. Positive angles herein represent rotations in the twist direction of the liquid crystal layer 5, i.e., clockwise rotations, while negative angles represent rotations in the opposite direction, i.e., counterclockwise rotations. The first (front-side) polarizing plate 1 was so positioned that its transmission axis 101a intersected the rubbing direction 104 of the front-side substrate 4 at an angle of 85° to 95°. The second (back-side) polarizing plate 3 was so positioned that its transmission axis 103a is shifted through an angle of −5° to 10° from the rubbing direction 104' of the back-side substrate 4'. A display image of the best quality could be obtained when, as shown in FIG. 1B, the S axis 107 of the phase plate 7 was shifted 10° from the rubbing direction 104 of the front-side substrate 4, the absorption axis 101b of the first polarizing plate 1 coincided with the rubbing direction 104 of the front-side substrate 4, and the absorption axis 103b of the second polarizing plate 3 was shifted 5° from the rubbing direction 104 of the front-side substrate 4.

Table 5 shows a comparison of the background color tones obtained by a liquid crystal display of the present invention and a conventional normally black mode liquid crystal display without a phase plate.

TABLE 5

|  | Background color | | | |
| --- | --- | --- | --- | --- |
|  | L* | u* | v* | C* |
| Example | 2.27 | −0.01 | 0.06 | 0.06 |
| Comparative example | 2.64 | 1.48 | −6.27 | 6.44 |

The liquid crystal display shown as an example of the present invention in Table 5 had the following construction: A liquid crystal cell of a first minimum design, which was the same as those used in the above-described other estimations, was used as the liquid crystal cell 2. As the first polarizing plate 1 and the second polarizing plate 3, the polarizing plates NPF-G1225DuN and NPF-G1220Du were used, respectively. As described above, this combination of polarizing plates makes it possible to obtain the best white display when an ON voltage is applied. As the phase plate 7, a uniaxially extended PVA film having a retardation value Re of 455 nm was used. The rubbing directions 104 and 104' of the substrates 4 and 4' of the liquid crystal cell 2, the absorption axes 101b and 103b of the polarizing plates 1 and 3, and the S axis 107 of the phase plate 7 were arranged as shown in FIG. 1B.

In the conventional normally black mode liquid crystal display shown as a comparative example in Table 5, the first and second polarizing plates were both composed of the polarizing plate NPF-G1220DuN manufactured by Nitto Denko Corporation. The absorption axis of the first (front-side) polarizing plate was shifted 5° clockwise from the rubbing direction of the front-side substrate of the liquid crystal cell. The absorption axis of the second (back-side) polarizing plate was shifted 85° clockwise from the rubbing direction of the back-side substrate. As mentioned above, a phase plate was not provided. The other construction of the liquid crystal display of the comparative example was the same as that of the liquid crystal display of the present invention.

AS can be seen from Table 5, the chroma C* of the background color was 0.06 in the liquid crystal display of the present invention while it was 6.44 in the liquid crystal display of the comparative example. This means that the liquid crystal display without a phase plate could not attain a dark tone of black in the display background. This low-quality black background obtained by the liquid crystal display of the comparative example which uses NPF-G1220DuN as the polarizing plates had a darker tone of black, as compared with liquid crystal displays without a phase plate which use other polarizing plates. For example, when the polarizing plates G1225DuN, G1220Du, G1225Du, F1220Du and F1225Du (all manufactured by Nitto Denko Corporation) were used in liquid crystal displays without a phase plate, the resultant display backgrounds became worse in the tone of black.

The liquid crystal displays of the present invention described above are black-and-white displays without a color filter. The present invention, however, can be applied to color liquid crystal displays using color filters or the like. In this case also, the same effects can be attained.

As can be seen from the above description, according to the present invention, a liquid crystal cell of a first minimum design is used in combination with a phase plate which satisfies specific requirements. Thus, even when the liquid crystal cell of the first minimum design is used in the normally black mode, both the display background and the display images obtained by the application of ON and OFF voltages can be made to have excellent color tones, without changing the liquid crystal cell design, and especially without changing the ratio of the capacitance of the liquid crystal to that of the active element. This makes it possible to provide an active matrix type liquid crystal display in the normally black mode which can produce a high-quality display image by using a liquid crystal cell of a first minimum design.

In the liquid crystal displays of the present invention described above, the substrates 4 and 4' are so positioned that the liquid crystal molecules are twisted through an angle of 90° in a clockwise direction (when viewed from the back-side substrate 4'). It is understood, however, that the substrates 4 and 4' can also be positioned so that the liquid crystal molecules are twisted through an angle of 90° in a counterclockwise direction (when viewed from the backside substrate 4'). In this case, the axes of the phase plate 7 and the polarizing plates 1 and 3 are arranged by allowing the above-mentioned positive angles to determine rotations of the axes in the twist direction of the liquid crystal molecules, i.e., counterclockwise rotations of the axes, and by allowing the negative angles to determine clockwise rotations of the axes. With this arrangement also, the above-described effects of the present invention can be attained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display which operates in a normally black mode, comprising:

a liquid crystal cell including a pair of substrates and a liquid crystal filled between the substrates, the liquid crystal cell being of a first minimum design; and a phase plate located adjacent to one of the substrates of the liquid crystal cell and having a retardation value of 400 to 500 nm, the wavelength dependency of the retardation value of the phase plate being substantially uniform, thereby improving display quality in the normally black mode.

2. A liquid crystal display according to claim 1, wherein a value obtained by subtracting a product $\Delta n \cdot d$ from the retardation value of the phase plate is in the range from 8.5 nm to 108.5 nm, where $\Delta n$ is the anisotropy of refractive index of the liquid crystal and d is a thickness of the liquid crystal cell.

3. A liquid crystal display according to claim 2, wherein the product $\Delta n \cdot d$ of the anisotropy of refractive index ($\Delta n$) of the liquid crystal and the thickness d of the liquid crystal cell is 400 nm or less.

4. A liquid crystal display according to claim 1, wherein the phase plate is a uniaxially extended polyvinyl alcohol film.

5. A liquid crystal display according to claim 1, wherein the liquid crystal is a twisted nematic liquid crystal which undergoes a 90° twist in a predetermined direction.

6. A liquid crystal display according to claim 5, which further comprises first and second polarizing plates located on both sides of the liquid crystal cell, respectively, wherein the phase plate is positioned between the first polarizing plate and the liquid crystal cell, a transmission axis of the first polarizing plate is shifted through an angle of 85° to 95° in the predetermined direction from a rubbing direction of one of the substrates which is adjacent to the first polarizing plate, and a transmission axis of the second polarizing plate is shifted through an angle of −5° to 10° in the predetermined direction from a rubbing direction of the other substrate which is adjacent to the second polarizing plate.

7. A liquid crystal display according to claim 6, wherein a slow axis of the phase plate is shifted through an angle of 0° to 15° in the predetermined direction from the rubbing direction of one of the substrates which is adjacent to the phase plate.

8. A liquid crystal display according to claim 6, wherein the first and second polarizing plates, the liquid crystal cell and the phase plate are so positioned that light is incident on the second polarizing plate and emitted from the first polarizing plate.

9. A liquid crystal display according to claim 1, wherein the substrates are respectively provided with electrodes for applying a voltage to the liquid crystal, and one of the electrodes includes a plurality of pixel electrodes, each of the pixel electrodes being provided with a switching element.

10. A liquid crystal display according to claim 9 wherein the switching element is an MIM element.

11. A liquid crystal display according to claim 1, wherein a ratio of a capacitance of the liquid crystal cell to a capacitance of an active element of the liquid crystal display is greater than or equal to 10.

12. A liquid crystal display comprising:

a liquid crystal cell including a pair of substrates and a liquid crystal filled between the substrates, the liquid crystal being a twisted nematic liquid crystal which undergoes a 90° twist in a predetermined direction;

a phase plate located adjacent to one of the substrates of the liquid crystal cell and having a retardation value of 400 to 500 nm, the wavelength dependency of the retardation value of the phase plate being substantially uniform; and first and second polarizing plates located on both sides of the liquid crystal cell, respectively, wherein a transmission axis of the second polarizing plate is shifted through an angle of 5° in the predetermined direction from a transmission axis of the first polarizing plate, the phase plate is positioned between the first polarizing plate and the liquid crystal cell, and a slow axis of the phase plate is shifted through an angle of 10° in the predetermined direction from a rubbing direction of one of the substrates which is adjacent to the phase plate.

13. A liquid crystal display comprising:

a liquid crystal cell including a pair of substrates and a liquid crystal filled between the substrates, the liquid crystal being a twisted nematic liquid crystal which undergoes a 90° twist in a predetermined direction;

a phase plate located adjacent to one of the substrates of the liquid crystal cell and having a retardation value of 400 to 500 nm, the wavelength dependency of the retardation value of the phase plate being substantially uniform; and first and second polarizing plates located on both sides of the liquid crystal cell, respectively, wherein the phase plate is positioned between the first polarizing plate and the liquid crystal cell, a transmittance of the first polarizing plate is higher than that of the second polarizing plate, a transmission axis of the first polarizing plate is shifted through an angle of 85° to 95° in the predetermined direction from a rubbing direction of one of the substrates which is adjacent to the first polarizing plate, and a transmission axis of the second polarizing plate is shifted through an angle of −5° to 10° in the predetermined direction from a rubbing direction of the other substrate which is adjacent to the second polarizing plate.

14. A liquid crystal display according to claim 13, wherein the transmittance of the first polarizing plate is higher than that of the second polarizing plate by 3%.

15. A method for improving display quality of a liquid crystal display in a black mode comprising the steps of:

locating a phase plate having a retardation value adjacent to one substrate of a pair of substrates located on either side of a liquid crystal cell of a first minimum design of the liquid crystal display;

operating the liquid crystal display in the black mode; and varying the retardation value of the phase plate until the display quality of the liquid crystal display in the black mode is optimized.

\* \* \* \* \*